Feb. 2, 1932.   M. WILDERMAN   1,843,531
ELECTRIC BATTERY
Filed Oct. 12, 1928
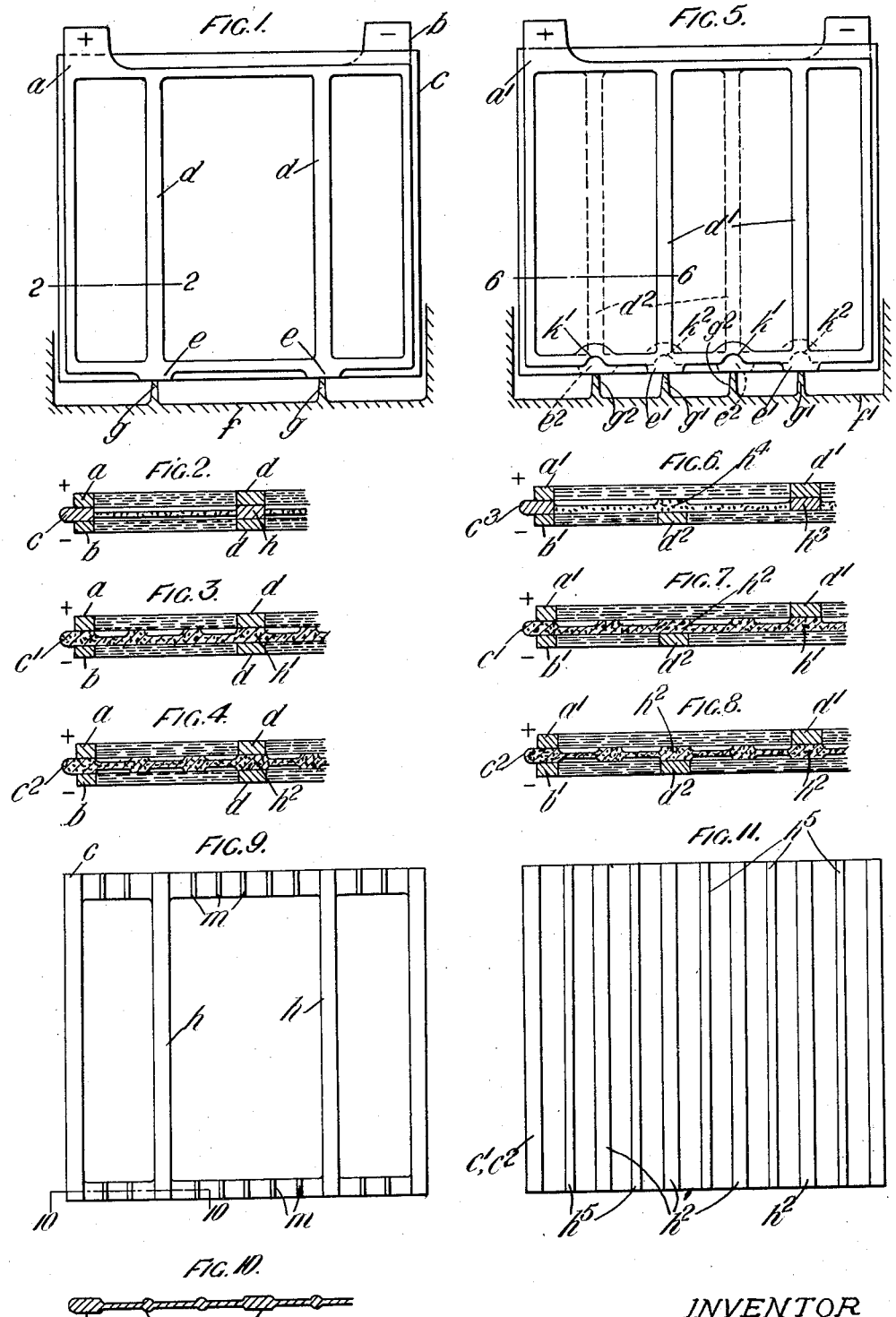
INVENTOR
Meyer Wilderman
by Byrne, Stebbins & Parmelee
his Attys.

Patented Feb. 2, 1932

1,843,531

UNITED STATES PATENT OFFICE

MEYER WILDERMAN, OF HAMPSTEAD, LONDON, ENGLAND, ASSIGNOR, BY MESNE ASSIGNMENTS, TO THE AMERICAN WILDERMAN POROUS EBONITE COMPANY, INC., OF PHILADELPHIA, PENNSYLVANIA, A CORPORATION OF PENNSYLVANIA

ELECTRIC BATTERY

Application filed October 12, 1923, Serial No. 312,158, and in Great Britain July 7, 1928.

This invention has for its object to prevent short-circuiting in electric batteries.

In the working of the electric battery it is essential that no short circuiting should take place between the electrodes. It is so essential that treated wooden separators have been introduced, in spite of their short life and a number of disadvantages, instead of perforated sheets of ebonite having a much longer life.

The introduction of porous ebonite separators has removed the difficulties connected with treated wooden separators. On account of their much longer life the short circuiting between the surfaces of the active material of the positive and negative electrode within the outer rims of the grids of the electrodes is greatly decreased or entirely eliminated.

By the use of electrodes having feet at the lower rim and by the use of porous ebonite separators, or separators in general, of a larger size than the electrodes, so that the separators project out of the electrodes all round the outer rims of the electrodes, and especially by the introduction of porous ebonite separators having frames made of nonporous ebonite, short circuiting around the rims of the positive and negative electrodes was also prevented, except, however, at the feet of the electrodes resting upon the supports of the container at its bottom. Here the falling down active material of the electrodes collects as usual on the supports of the container, causing shortcircuiting, and there is no possibility of preventing this by means of the separator.

The applicant proposed in his application, Ser. No. 312,156, filed October 12, 1928, to make the separator with cut-outs at the bottom of the separator so that the separator meets with its cut-outs these supports of the container and can be pushed down over these supports. This, however, presents its difficulties. If the cut-outs are much larger than the supports then it does not serve sufficiently for preventing short circuiting at the supports of the container, and if the cut-outs are made to fit the supports, difficulty is found in assembling the electrodes and the separators, and in bringing them in into the container, these operations becoming precision work, which must be avoided in the practical handling of the battery.

It must be emphasized that the short circuiting of a battery, and its consequent losing its value, almost invariably first takes place at the supports of the container. It is an urgent problem for which no adequate solution has been found up to the present.

It is evident that this problem cannot be solved only by the construction of the separator alone. For this a new construction of the electrodes themselves will be necessary, which in combination with the correct construction of the separator and of the container alone can solve the problem.

This forms the subject of the present invention which is illustrated by the Figures 1–11.

For this I construct the electrodes in such a manner that the grids of the electrodes contain above the supports of the container metal strips of lead-antimony, i. e. strips having no active material which in the course of working of the battery could fall off from the electrodes and falling down settle on the supports of the container. The separator is so constructed, that it fills up the total space between the electrodes at these supports of the container so as to prevent the falling off active material entering the space over the supports of the container. The metal strips are taken to be wider than the supports of the container on which the metal strips of the grid of the electrodes rest and may be widened at the bottom.

By way of example I give here a few illustrations:—

Fig. 1 represents side elevation of the positive electrode ($a$) and of the negative electrode ($b$), with the separator ($c$) between, projecting out of the electrodes. The electrodes and the separators are provided with two vertical ribs ($d$) coinciding together, the electrodes having in this case feet ($e$) at the bottom below the two vertical ribs ($d$) and standing on the supports ($g$) of the container ($f$) which are so arranged as to come under the feet ($e$) of the electrodes. The object of the feet ($e$) being to make the separator resting on the supports of the container project below the lower rims of the electrodes thus better separating and insulating the same.

Fig. 2 is an enlarged section of Fig. 1 on line 2—2 of Fig. 1. The negative electrode is shown to be thinner than the positive electrode, but it may also be taken of the same thickness. The separator is made of porous ebonite or any other suitable material, provided with a noncompressible frame $(c)$ made of nonporous ebonite or any other suitable material, having vertical ribs $(h)$ made of the same noncompressible material as the frame; the vertical strips $(d)$ of the positive and negative electrodes and the rib $(h)$ of the separator coinciding and leaving no free space between the ribs of the positive and negative electrode and supporting the electrodes at the same time. It will be noted that the vertical ribs of the electrodes and separator are essentially wider than the supports $(g)$ of the container.

In this case the porous ebonite separator is removed both from the positive and negative electrode, leaving a greater space between the separator and the positive electrode than between the diaphragm and the negative electrode.

Fig. 3 is a similar figure to Fig. 2 showing a modified separator consisting of porous ebonite but having no nonporous frame. The vertical strips $(c)$ and $(h)$ of Fig. 2 made of non-porous noncompressible ebonite here consist of porous ebonite and are denoted by letters $(c')$ and $(h')$, coinciding with the vertical ribs $(d)$ of the electrodes and supporting the same. The porous ebonite separator is here represented to be flat and in contact with the negative electrode and is provided with narrow vertical ribs on the positive side, leaving free spaces for the solution between the separator and the positive electrode. The narrow vertical ribs between the wider separating ribs $(h')$ support and separate the two electrodes.

Fig. 4 is also a similar figure to Fig. 2 showing another modified separator made of porous ebonite, having the porous separator removed from the positive and negative electrodes but leaving a bigger space between the separator and the electrode on the positive side than on the negative side. The separator is provided with vertical strips of porous ebonite $(h^2)$ covering and separating the two vertical strips $(d)$ of the positive and negative electrode and filling up the space between them.

Fig. 5 is a side elevation of a modified form of the positive electrode $(a')$ and negative electrode $(b')$ with a separator $(c')$ between. Each electrode has two vertical ribs, $(d')$ indicating the two vertical ribs of the positive electrode and $(d^2)$ the two vertical ribs of the negative electrode. Both electrodes have the same shape but their positions are reversed when assembled in the battery. In assembled position, the vertical ribs $d'$ and $d^2$ of the positive and negative electrodes respectively, do not lie directly opposite each other, as is the case in the arrangement shown in Figs. 1 to 4. Each electrode is shown to have two cut-outs at the bottom, $(k')$ indicating the cut-outs of the positive electrode and $(k^2)$ the cut-outs of the negative electrode. These are so arranged in the electrode that when the electrodes and separators are put together the cut-outs of one electrode are opposite the vertical ribs of the other electrode. It must also be understood that the electrodes could be made also without such cut-outs. Under the two vertical ribs of the electrodes there are feet, $(e')$ on the positive electrode and $(e^2)$ on the negative electrode. The electrodes stand on these projections, the container $(f')$ being so arranged that two supports for the electrodes come exactly under the projections of the positive electrodes and two supports under the projections of the negative electrodes. Also here the supports $(g')$ of the positive electrodes and $(g^2)$ of the negative electrodes are essentially narrower than the vertical strips $(d')$ or $(d^2)$ of the electrodes. The separator projects out all round the rims of the electrodes resting upon the same supports $(g')$ and $(g^2)$. The separator $c'$ shown in Figure 5, and the separator $c$ shown in Figure 1, if desired, may be provided with cut-out portions at their lower edges corresponding in position to the supports $g'$ and $g^2$ so that the separators will project downwardly beyond the electrodes even farther than shown in Figures 1 to 5. This arrangement further decreases the danger of short circuiting.

Fig. 6 is an enlarged section on line 6—6 of Fig. 5 showing a porous ebonite separator having vertical ribs $(h^3)$ made of nonporous ebonite in the same way as the frame $c^3$ of the separator and separating the rib $(d')$ of the positive electrode from the negative electrode. The separator has a porous ebonite rib $(h^4)$ separating the vertical rib $(d^2)$ of the negative electrode from the positive electrode. The reason for this arrangement is that the active material of the positive electrode leaves the electrode much easier than the active material of the negative electrode, so that although it is necessary to provide an imperishable non-porous separating rib $h^3$ of the separator at the vertical rib $(d')$, such a rib of nonporous ebonite is avoided at the rib $(d^2)$ of the negative electrode, in order not to diminish too greatly the active surface of the positive electrode. The porous ebonite separator is shown here, by way of example, as adjacent to the negative electrode and leaving free space for the solution between the separator and the positive electrode.

Fig. 7 is a modification of Fig. 6, in which the separator frame $c'$ and vertically separating strips $h^2$ are made of porous ebonite, the object being to reduce the active surfaces of the electrodes as little as possible. Fig. 8 is another modification of Fig. 6, the separator consisting of porous ebonite alone and being removed from the positive and negative electrode, leaving a larger space between the separator and the positive electrode than between the separator and the negative electrode. The separator is provided with porous ribs ($h^2$) covering completely the vertical ribs ($d'$) of the positive and ($d^2$) of the negative electrode and is further provided with narrow vertical porous ribs between, so as to support the electrodes.

Fig. 9 is a side elevation of a separator given by way of example. The same comprises an ebonite frame and two vertical ribs ($h$), the separator to be used with the arrangements and construction of the electrodes given under Fig. 1. The vertical strips of the frame and the vertical strips ($h$) have the same thickness as the upper and lower distance between the electrodes, while the horizontal strips of the frame have the same or nearly the same thickness as the porous diaphragm and are provided with small projections ($m$) as shown in Fig. 10 to keep the electrodes apart and to support the same. The porous diaphragm is here removed both from the positive and the negative electrodes, but is more removed from the positive electrode than from the negative electrode.

Fig. 10 is a section of the frame on the line 10—10 of Fig. 9.

Fig. 11 represents a porous diaphragm without a frame adapted to be used in connection with the electrodes of Fig. 5, having porous ebonite ribs ($h^2$) shown in Fig. 7 or 8 with narrow vertical porous strips as shown in the same Figures 7 or 8 and denoted by ($h^5$).

Figs. 9 and 11 may be made with cut-outs under the vertical strips ($h$) or ($h^2$) into which the supports ($g$) of the containers could enter a few millimeters.

By introducing the vertical strips into the electrodes the active surfaces of the same become smaller by a few per cent and this is a disadvantage. On the other hand such an electrode with two or more vertical strips is very much stronger, can be made thinner and at the same time it will have a much longer life and be less liable to bending or buckling, so that a more rationally constructed battery can be easily produced. It is known that in most of the batteries on the market there is no balance between the active material of the positive and the negative electrode so that the negative electrode can be made thinner. A battery can easily be constructed having thirteen plates instead of eleven plates, requiring no more active material, so that a battery having a larger capacity, having the same volume and giving short circuiting at the supports of the electrodes only after a very much longer time, will be the outcome of such a construction.

Instead of arranging two or more vertical lead-antimony strips within the grids of the electrodes above the supports of the container, two or more vertical strips of the active surface of the electrode above the supports of the container may be insulated on both sides of the electrode, thus preventing these insulated strips of the active material of the electrodes from taking part in the chemical reactions. The separators are constructed and arranged also here, as given above.

It is evident that by using flat vertical insulated strips in the separators, filling up the spaces between the positive and negative electrodes over the supports of the container, the surfaces of the electrodes in contact with these insulating strips of the separators are thus insulated from one another, and no current can pass at these places from one electrode to the other if the electrodes and separators are well pressed together to one block. This will also considerably reduce the amount of the active material which can leave the strips of the electrodes above the supports of the container. This arrangement, however, will not be as efficient and secure as the first two arrangements described above.

I do not restrict the construction of the electrodes or of the separator to the shapes given above by way of example, nor to the material of the separator or to the active material of the electrodes as mentioned above, nor to the number of the vertical strips in the grid of the electrodes, which for large size of electrodes may be increased.

Having now particularly described and ascertained the nature of my said invention and in what manner the same is to be carried through I declare that what I claim is:—

1. An electric battery comprising positive and negative electrodes having substantially vertical strips of nonactive material which is not decomposed during operation of the battery, separators, and a container provided with supports for the electrodes and separators, said vertical strips of non-active material being placed directly over the supports, the separators being provided with ribs which contact with and fill up the space between the strips on adjacent electrodes, the ribs on the separators and the strips on the electrodes being at least as wide as the supports of the container.

2. An electric battery comprising positive and negative electrodes having substantially vertical strips of nonactive material which is not decomposed during operation of the battery, separators, and a container provided with supports for the electrodes and separators, said vertical strips of non-active material being placed directly over the supports, the separators being provided with ribs which contact with and fill up the space between the strips on adjacent electrodes, the ribs on the separators and the strips on the electrodes being at least as wide as the supports of the container, said non-active strips on the electrodes being of the same material as the grids.

3. An electric battery comprising positive and negative electrodes having substantially vertical strips of nonactive material which is not decomposed during operation of the battery, separators, and a container provided with supports for the electrodes and separators, said vertical strips of non-active material being placed directly over the supports, the separators being provided with porous ribs which contact with and fill up the space between the strips on adjacent electrodes, the porous ribs on the separators and the strips on the electrode being at least as wide as the supports of the container.

4. An electric battery comprising positive and negative electrodes having substantially vertical strips of nonactive material which is not decomposed during operation of the battery, separators, and a container provided with supports for the electrodes and separators, said vertical strips of non-active material being placed directly over the supports, the separators being provided with non-porous ribs which contact with and fill up the space between the strips on adjacent electrodes, the nonporous ribs on the separators and the strips on the electrodes being at least as wide as the supports of the container.

In witness whereof I affix my signature.

DR. MEYER WILDERMAN.